United States Patent [19]
Baymiller

[11] 3,816,236
[45] June 11, 1974

[54] CROSS-BANDING MATERIAL FOR WOOD VENEERS

[75] Inventor: John W. Baymiller, Lancaster, Pa.

[73] Assignee: Armstrong Cork Company, Lancaster, Pa.

[22] Filed: Dec. 27, 1971

[21] Appl. No.: 212,039

[52] U.S. Cl. ................ 161/188, 156/310, 156/313, 156/331, 161/258, 161/261
[51] Int. Cl. ... B32b 23/08, B32b 23/10, B32b 27/42
[58] Field of Search .......... 161/258, 259, 261, 188; 156/331, 310, 313, 315

[56] References Cited
UNITED STATES PATENTS

| | | | |
|---|---|---|---|
| 2,483,198 | 9/1949 | Hall | 161/259 |
| 2,639,258 | 5/1953 | Evans et al. | 156/310 |
| 2,656,296 | 10/1953 | Grangaard | 161/258 |
| 2,680,995 | 6/1954 | Frost et al. | 161/258 |
| 2,699,417 | 1/1955 | Repsher et al. | 161/261 |
| 2,711,380 | 6/1955 | Pintell | 161/258 X |
| 2,817,620 | 12/1957 | Golick et al. | 161/261 |
| 2,890,148 | 6/1959 | Dede | 161/258 X |
| 3,437,542 | 4/1969 | Mills | 156/331 |
| 3,518,159 | 6/1970 | Freeman et al. | 161/258 |
| 3,666,597 | 5/1972 | Parnell | 156/331 |
| 3,703,494 | 11/1972 | Anderson et al. | 161/259 X |
| 3,730,828 | 5/1973 | Meiser | 161/258 |

Primary Examiner—Harold Ansher

[57] ABSTRACT

A veneered or laminated board structure is conventionally made of a wood core which has a surface covering made of a cross-banding material and then this is followed by a wood veneer finish layer. Herein, the cross-banding material is made from a porous felt sheet containing uncatalyzed urea-formaldehyde resin. The adhesive which is applied to the felt sheet to glue it to the wood core and veneer layer contains a catalyst. During the laminating process, the catalyst of the adhesive catalyzes the urea-formaldehyde resin in the cross-banding material.

2 Claims, 2 Drawing Figures

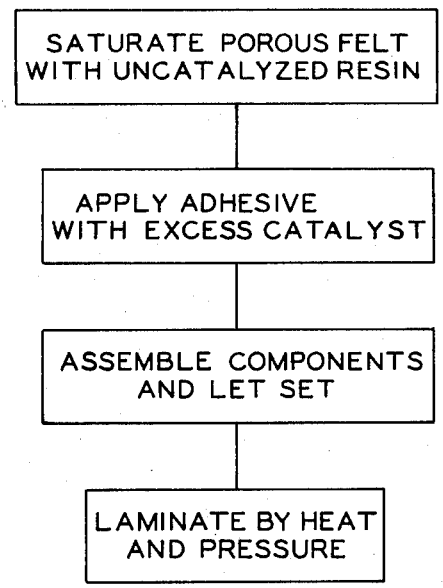
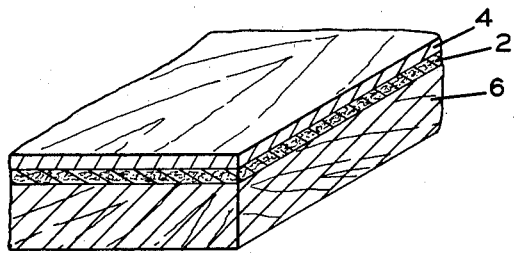

CROSS-BANDING MATERIAL FOR WOOD VENEERS

BACKGROUND OF THE INVENTION

1. Field of the Invention

The invention is directed to a laminated wood construction and, more particularly, to a cross-banding material for the laminated wood construction.

2. Description of the Prior Art

The usual cross-banding material employed in the furniture panel manufacturing art is a thin ply of natural wood 1/24 inch to 1/28 inch in thickness. It is sandwiched between core stock, which can be lumber or chip board, and face veneer, with its grain at a right angle to that of the core and veneer. When this assembly is bonded together with adhesive under heat and pressure, the cross-banding provides considerable dimensional stability to the panel and resistance to warping and cracking of the veneer.

As good quality wood becomes less available and higher in cost, attention is being turned to synthetic cross-banding materials which are generally paper board sheets saturated with a thermosetting resin, typically a liquid phenolic. The resin-saturated sheet is usually partially cured to prevent resin migration or bleed-through during panel bonding. The Meade Paper Company has been furnishing to the industry such a material which consists of a sheet of about .022 inch thickness containing 35 to 40 percent phenolic resin.

International Paper Company had previously made a urea-formaldehyde resin sheet, but experienced trouble in its use. Their particular product is a kraft paper which has been saturated with the urea-formaldehyde and then partially cured before panel assembly. Control of the semicure is critical and creates problems in manufacture and storage which could be costly, if not handled with care.

SUMMARY OF THE INVENTION

The cross-banding material is made from a felt sheet which has been saturated with a urea-formaldehyde resin which is uncatalyzed. The felt is an open porous sheet which saturates completely in a very short time in the resin solution. The cross-banding material is coated, both sides, with an adhesive and is placed without delay between the veneer material and core material. The adhesive is a urea-formaldehyde adhesive which has a catalyst content somewhat more than normal. The assembled product is permitted to set for a short period of time during which time the catalyst from the adhesive migrates into the porous felt cross-banding material containing the urea-formaldehyde resin. When the assembly is consolidated under heat and pressure, a very strong bond is secured between the three layers, and the urea-formaldehyde resin in the cross-banding material is cured.

BRIEF DESCRIPTION OF THE DRAWING

FIG. I is a flow chart of the inventive process; and
FIG. II is a view of the assembled veneer product.

DESCRIPTION OF THE PREFERRED EMBODIMENT

The cross-banding material 2 of FIG. II is made from a felt material, which is in sheet form and which may be composed of rag and asplund wood fibers, saturated with a urea-formaldehyde resin which is uncatalyzed.

The porosity of the felt material is such that, when the dry saturated felt is floated on water at 75° F., it will be completely rewetted in 20 seconds. The felt material used is .034 inch in thickness and is made by forming and drying a sheet from a slurry of rag and wood fibers on a conventional paper making machine, such as a Fourdrinier. The wood veneer layer is shown as 4 in FIG. II, and the core stock is 6. It can be seen that the felt layer is placed between the two layers 4 and 6. An adhesive is used to bond together the three layers.

The felt is saturated with a urea-formaldehyde resin. The resin used in the example has a viscosity of about 500–1,000 centipoises, a shelf life of about nine months at 70° F. and a cure or gel time of about 40 minutes when mixed with 2 percent ammonium chloride catalyst at 75° F. The felt material is an open porous sheet such that will saturate completely in the resin solution in about 10 seconds immersion time. The resin solution is adjusted to about 40 to 50 percent solids, temperature 80° F. The first step in the operation of preparing the cross-banding material is to saturate the sheet and then to squeeze the sheet between rolls to attain about 42 percent dry solids when the sheet is dried to approximately 5 percent moisture. Overdrying should be avoided as the temperature of the sheet will rise, and curing may occur. The sheet is now ready for panel assembly.

First, both sides of the sheet are coated with a urea-formaldehyde resin. Recommended adhesive pick-up is 28 to 32 grams per square foot, both sides, of the cross-banding material. The adhesive-coated cross-banding material is immediately sandwiched between the veneer wood layer and the core layer and allowed to set for at least 5 minutes, and preferably not more than 15 minutes. Next, the assembly is pressed between caul plates for 6½ minutes at 250° F. at a pressure of 120 to 150 pounds per square inch on the paneled areas.

The successful use of the cross-banding material herein, as a cross-banding material, depends upon its ability to absorb quickly and uniformly the necessary amount of catalyst from the adhesive to cure the urea-formaldehyde resin in the cross-banding material. The above-described felt material has this property in that it has the characteristic of being completely rewetted by water in 20 seconds when it is floated on water at 75° F. When this is compared against the only other commercially available urea-formaldehyde kraft paper cross-banding material which will not completely rewet after 8 minutes, it is clear that the felt of the cross-banding material herein is very porous. In order to obtain reliable results, the composition of the adhesive should be adjusted to provide excess catalyst.

A recommended formula for the adhesive is as follows:

| Materials | Parts by Weight |
|---|---|
| Urea-formaldehyde resin (65% solids) Southeast Adhesives Co. 265-S | 150.0 |
| Nutshell flour | 25.0 |
| Tricalcium phosphate, $CA_3(PO_4)_2$ | 3.0 |
| Catalyst Solution | 18.0 |

The formulation for the catalyst solution is as follows:

| Materials | Parts by Weight |
|---|---|
| Catalyst Solution: | |
| Ammonium sulphate | 1.0 |
| Aqueous ammonia (28%) | 3.0 |

TABLE-Continued

| Materials | Parts by Weight |
|---|---|
| Water | 2.0 |

The active part of the catalyst, the ammonium sulphate, amounts to about 3 percent of resin solids in the formula. This somewhat high level of catalyst insures absorption by the felt of a concentration sufficient to cure the resin of the cross-banding material. Experiments have shown that 2 percent catalyst tends to be borderline and 1 percent catalyst tends to be insufficient when one is comparing the ratio of catalyst to resin solids. The shell flour provides resin "hold-out" to insure good adhesive joint with a minimum of water. By resin "hold-out" is meant prevention of complete absorption of resin solids from the surfaces of materials to be joined which would result in a "starved" joint.

The tricalcium phosphate is a buffer to counteract any excess acidity formed on aging of the joint.

Panels prepared as described above have been cycled between 90 percent and 8 percent relative humidity without failure. Also pieces of the panel have been subjected to boiling water for 10 minutes and a 60 hour soak in 70° F. water without any joint failure at the cross-banding material.

The use of a semi-cured urea-formaldehyde sheet creates problems of control in its manufacture and storage because of the criticality of the semi-cure point. The use of a phenolic resin in lieu of a urea-formaldehyde resin creates problems of cost in that the phenolic runs about 20 cents per pound for the liquid phenolic and 30 cents per pound for the powdered phenolic whereas the urea can be purchased for about 6 cents per pound. Consequently, in addition to securing a good product, there are certain economical advantages to the use of a urea-formaldehyde cross-banding material. It is particularly advantageous when the urea-formaldehyde material is used with a porous felt material so that the urea-formaldehyde may be saturated in the felt without the need for a catalyst included therein.

What is claimed is:

1. The method of assembling a laminated wood veneer structure comprising the steps of saturating a porous felt material, which constitutes the cross-banding material, with an uncatalyzed urea-formaldehyde resin, coating the cross-banding material with a urea-formaldehyde adhesive having excess catalyst, assembling together the cross-banding material between a piece of core stock and veneer wood stock, permitting the assembly to set for a short period of time so that the catalyst of the adhesive will migrate into the porous felt cross-banding material, and then laminating by heat and pressure, the assembly into a bonded product of veneer wood, cross-banding material and core stock.

2. A wood veneer laminated structure comprising a core stock material and a veneer wood layer, therebetween a porous felt cross-banding material which has been saturated with an uncatalyzed urea-formaldehyde resin, said cross-banding material is a porous sheet of rag and asplund wood fibers which is capable of becoming completely saturated by water with 20 seconds of immersion in the water at 75° F., both surfaces of said cross-banding material have been coated with a urea-formaldehyde adhesive which contains an excess of catalyst for the resin, whereby the assembled product of wood veneer, cross-banding and core stock are bonded together with the urea-formaldehyde resin of the cross-banding material gelled due to the catalyst of the adhesive.

* * * * *